May 9, 1967

J. E. GOETZ 3,318,007

PRECISION CONNECTOR GAUGE

Filed May 28, 1965

INVENTOR.

JOHN EDWARD GOETZ

BY HIS ATTORNEYS
HARRIS, KIECH, RUSSELL & KERN

United States Patent Office 3,318,007
Patented May 9, 1967

3,318,007
PRECISION CONNECTOR GAUGE
John Edward Goetz, Santa Monica, Calif., assignor to Measurement Specialties Laboratory, Inc., Van Nuys, Calif., a corporation of California
Filed May 28, 1965, Ser. No. 459,739
8 Claims. (Cl. 33—172)

This invention relates to a device for determining dimensions of connectors and more particularly to a device especially suitable to the measurement of either the male or female member of a radio frequency coaxial type connector.

Acceptable dimensional tolerances are established for various connectors and it is important that the tolerances be met in the production of acceptable components and in the assemblage of the components into a unit.

Assembled connectors having precise dimensions protect test equipment against damage and also greatly contribute to the reliability and useful life of test cable assemblies incorporating such connectors.

Cables are a significant and integral part of a test system. Poorly assembled connectors can damage expensive test equipment such as signal sources, attenuators, directional couplers, and frequency meters. Proper control of connector dimensions protects against damage and contributes to precision and the accuracy obtainable in a coaxial measurement system.

Commercially available connector gauges now in use are designed for the measurement of either male or female connectors and when it is desired to check the tolerances of say a male connector after the use of the gauge to check a female connector, it is necessary to modify the gauge by an adapter.

It is a primary object of the invention to provide a device which may be employed for the measurement of both male and female connectors.

It is another object of the invention to provide a device which will measure precisely the center pin depth of radio frequency coaxial connectors.

It is a further object of the invention to provide a connector gauge having a simplified and reliable design.

It is another object of the invention to provide a connector gauge that may employ the same dial indicator zero reference setting for the measurement of either a male or female coaxial connector.

It is a still further object of the invention to provide a connector gauge that has a simplified mode of operation.

Broadly, the connector gauge of the invention includes a tubular base fixture which is adapted to be fitted to a dial indicator. The base fixture includes a tubular track member through which an elongated movable spindle of the dial indicator extends. A tubular collar member is slidably mounted on the tubular track and occupies a first position wherein the collar member is wholly mounted on the tubular track member and is movable to a second position wherein the outer end of the tubular collar member extends beyond the outer end of the tubular track member. In the retracted first position the connector gauge may be used for checking the tolerances of a female radio frequency coaxial connector. In its extended second position the device may be employed for measuring a male connector.

In its preferred embodiment, the tubular base fixture, which is adapted to be held to a dial indicator of a type having a fixed tubular stem with a movable spindle extending therethrough, is made up of a mounting portion and an integral elongated tubular track member of reduced cross section. The mounting portion of the tubular base fixture has a countersunk hole in alignment with the passage of the fixture which countersunk hole is sized to snugly engage the stem of the dial indicator. The tubular collar member which is slidably carried by the tubular track of the base fixture has a tubular protuberance of reduced outside dimension which in the extended second position of the device is sized to fit about a split ring member which encircles a connector pin of a male connector. The free end of the longitudinally movable spindle is provided with an axially extending cavity in which the male member is housed during measurement with the end of the spindle resting on a shoulder encircling the base of the pin.

These and other objects and advantages of the device of the invention will become more apparent in the following description and drawings wherein.

Figure 1:
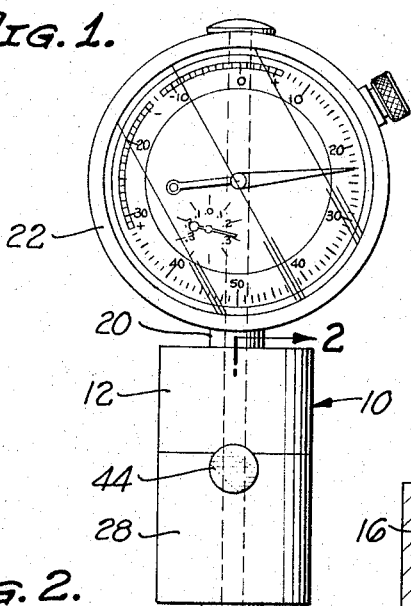
FIG. 1 is a front elevational view of a preferred embodiment of the device of the invention.
Figure 3:
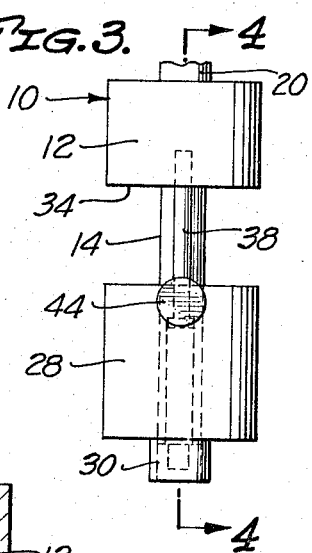
FIG. 3 is a fragmentary, elevational view illustrating the device of FIG. 1 in its extended position.
Figure 2:
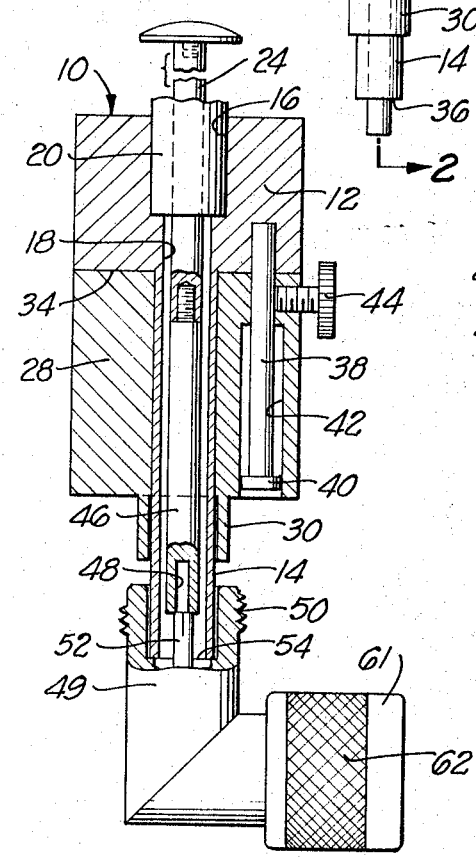
FIG. 2 is an enlarged, fragmentary, longitudinal sectional view taken along line 2—2 of FIG. 1 illustrating the device in the measurement of a female radio frequency connector.

As illustrated in the drawings, the device of the invention includes a tubular base fixture 10 made up of an enlarged mounting portion 12 and an integral elongated tubular track member 14. The enlarged portion 12 at its outer end has a countersunk hole 16 in alignment with a smaller dimensioned longitudinally extending passage 18 of the base fixture. The countersunk hole 16 is sized to snugly engage a fixed tubular stem 20 of a dial indicator 22. A tubular collar member 28 having a tubular protuberance 30 with a considerably less outside dimension than the collar member proper is slidably mounted on the tubular track member 14 of the base fixture 10. As illustrated in FIGS. 1 and 2, the tubular collar member 28 occupies a first position wherein it is wholly mounted upon the tubular track member 14 with the outer end of the track member extending beyond the tubular protuberance 30 of the collar member. Desirably, the tubular collar member 28 is held in its first position in contact with a shoulder 34 of the enlarged mounting portion 12 of the base fixture 10. The tubular collar member 28 in a second position has its tubular protuberance 30 extending beyond the outer end 36 of the tubular track member 14.

A means is provided for releasably holding the tubular collar member 28 to the base fixture 10 in the two positions of the collar member. This means includes an elongated guide pin 38 which is held in a hole in the shoulder 34 of the enlarged portion 12 of the base fixture 10 with the guide pin being spaced from the tubular track member 14 and generally parallel thereto. The guide pin 38 has a somewhat enlarged head 40 which is disposed in an elongated cavity 42 of the tubular collar member 28 which cavity 42 generally parallels the elongated track member. The outward movement of the tubular collar member 28 away from the shoulder 34 of the tubular base fixture 10 into the second position of the device is determined by the length or depth of the cavity 42. The tubular collar member 28 may be fixed with respect to the base fixture 10 by turning down a laterally extending set screw 44 carried by the tubular collar member 28 into engagement with the guide pin 38.

Ordinarily the length of the spindle 24 of a conventional dial indicator will be inadequate for use in the device of the invention and it will be necessary to add a spindle extension 46 which is threadedly held to the outer end of the spindle 24 and which at its own outer end is provided with an elongated cavity 48.

Figure 4:
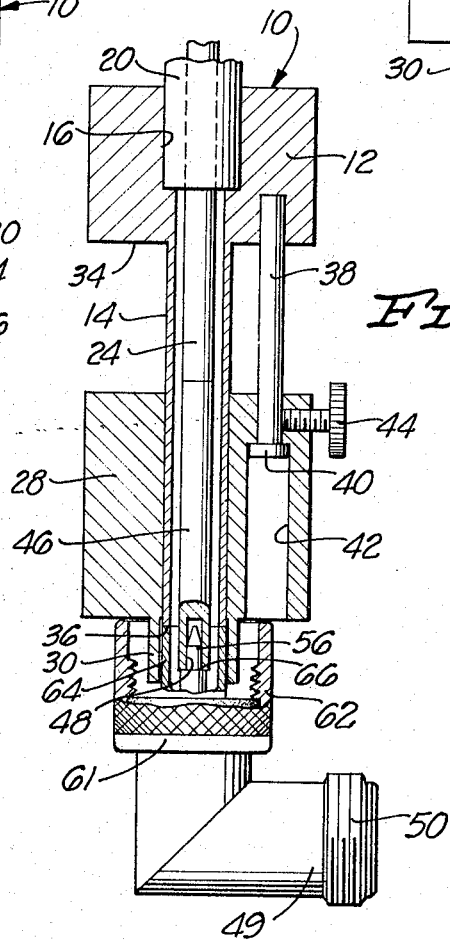
FIG. 4 is an enlarged, longitudinal sectional view taken along line 4—4 of FIG. 3 showing the device of the invention being employed in measurement of a male radio frequency connector.

The use of the device of the invention in checking the tolerances of both male and female ends of a radio frequency connector is illustrated in FIGS. 2 and 4 respectively. In FIG. 2 the device is set up to measure a female connector 49 and here it will be seen that the slidable tubular collar member 28 is wholly mounted upon the tubular track member 14 with the screw 44 turned into engagement with the guide pin 38. In this position the tubular collar member 28 is held in abutment against the shoulder 34 of the base fixture 10 and the outer end of the tubular track member 14 extends beyond the tubular protuberance 30 of the collar member. The female connector comprises an exteriorly threaded bushing 50 which houses a small diameter tubular member 52 which rises from a seat (not illustrated). An annular shoulder 54 is located on the interior wall of the bushing 50 intermediate of the length of the tubular member 52. The tubular member 52 has an interior passage sized to snugly engage a pin 56 of the male connector illustrated in cross section in FIG. 4. In measuring the dimensions of the female member, the exposed, outer end of the tubular track member 14 is located within the bushing 50 and brought into abutment with the annular shoulder 54. The end of the spindle extension 46 is brought to rest against the upper end of the small diameter tubular member 52 giving a reading upon the dial indicator 22.

Male connector 61 as seen in FIG. 4 includes a rotatable, internally threaded coupling ring 62 which is disposed about a concentrically located split ring member 64 with the aforementioned pin 56 being located on the longitudinal axis of the coupling. The pin 56 rises from a base within the connector and intermediate of its length is provided with a shoulder 66. The passage of the protuberance 30 of the sliding collar member 28 is sized to fit about the split ring member 64 with the outer end 36 of the tubular track member 14 resting on the upper end of the split ring member 64. The outer end of the spindle extension 46 rests on the shoulder 66 of the pin 56 with the upper end of the pin being within the cavity 48 of the spindle extension. With the foregoing setup, the dial indicator provides a reading of the dimensions of the pin of the male coupling.

Although an exemplary embodiment of the invention has been disclosed herein for pusposes of illustration, it will be understood that various changes, modifications, and substitutions may be incorporated in such embodiment without departing from the spirit of the invention as defined by the claims which follow.

I claim:
1. A gauge adapter for use with a dial indicator having a movable elongated spindle, said adapter comprising:
   a tubular base fixture adapted to be fitted to the dial indicator and having an elongated tubular track member through which the spindle extends;
   a tubular collar member slidably mounted on the tubular track member and occupying a first position wherein said collar member is wholly mounted on the tubular track member and being movable to a second position wherein the outer end of the tubular collar member extends beyond the outer end of said tubular track member; and
   means coupling said tubular collar member to said base fixture for selectively and releasably holding said tubular collar member in said two positions including a guide pin attached to said base fixture and disposed in an elongated cavity in the tubular collar member, said guide pin and cavity being spaced from and generally parallel to said tubular track member.

2. A gauge adapter for use with a dial indicator having a movable elongated spindle and for measurement of engageable coaxial male and female connectors, the male connector having a concentric split ring member, said adapter comprising:
   a base fixture adapted to be fitted to the dial indicator and having an elongated tubular track member through which the spindle extends;
   a tubular collar member slidably mounted on the tubular track member of the base fixture and having a tubular protuberance of reduced outside dimension adapted to fit about said split ring member of the male connector; and
   means selectively and releasably permitting movement of the tubular collar member from a first position wherein the tubular collar member is wholly mounted upon the tubular track member with the outer end of said track member extending beyond the tubular protuberance to a second position wherein the outer end of the tubular protuberance extends beyond the outer end of said tubular track member.

3. A gauge adapter for use with a dial indicator having a fixed tubular stem through which a movable elongated spindle extends and for measurement of engageable coaxial male and female connectors, the male connector having a cencentric split ring member, said adapter comprising:
   a tubular base fixture having an enlarged portion and an elongated tubular track member of reduced outside dimension and having a longitudinal passage therein, said enlarged portion having a countersunk hole in alignment with the passage of the track member and adapted to snugly receive the stem of the dial indicator;
   a tubular collar member slidably mounted on the tubular track member of the base fixture and having a tubular protuberance of reduced outside dimension adapted to fit about said split ring member of the male connector; and
   means selectively and releasably permitting movement of the tubular collar member from a first position wherein it is wholly mounted upon the tubular track member with the outer end of said track member extending beyond the tubular protuberance to a second position wherein the outer end of the tubular protuberance extends beyond the outer end of said tubular track member.

4. A gauge adapter for use with a dial indicator having a fixed tubular stem through which a longitudinally movable spindle extends and for measurement of engageable coaxial male and female connectors, the male connector having a solid center pin and the female connector having a tubular center pin, said adapter comprising:
   a tubular base fixture having an enlarged portion and an elongated tubular track member of reduced outside dimension and having a longitudinal passage therein, said enlarged portion having a countersunk hole in alignment with the passage of said tubular fixture and adapted to receive the stem;
   a tubular collar member slidably mounted on the tubular track member, said collar member occupying a first position wherein it is wholly mounted on the tubular track member of the base fixture and movable to a second position wherein the outer end of the tubular collar member extends beyond the outer end of said tubular track member;
   means for selectively and releasably holding said collar member in each of its said two positions; and
   a spindle extension adapted to be fixed to the outer end of the spindle of the dial indicator, the outer end of which being adapted to abut the tubular center pin of the female connector and to house the solid center pin of the male connector.

5. A gauge adapter for use with a dial indicator having a fixed tubular stem through which a movable elongated spindle extends and for measurement of engageable coaxial male and female connectors having a solid and a tubular center pin respectively, the male connector also having a concentric split ring member, said adapter comprising:
   a tubular base fixture having an enlarged portion and an integral elongated track member of reduced outside dimension and having an elongated passage therein, said enlarged portion having a countersunk hole in alignment with the passage of the fixture and with the countersunk hole being sized to snugly engage the stem of the dial indicator;

a tubular collar member slidably mounted on the tubular track of the base fixture and having a tubular protuberance of reduced outside dimension adapted to fit about said split ring member of the male connector, said tubular collar member having a first position wherein the collar member is wholly mounted upon the tubular track member and a second position wherein the tubular protuberance of said collar member extends beyond the outer end of said tubular track member;

means for selectively and releasably holding the tubular collar member in said two positions; and a spindle extension adapted to be attached to said spindle of the dial indicator, the outer end of which being adatped to abut the tubular center pin of the female connector and to house the solid center pin of the male connector.

6. In combination:

a dial indicator having an elongated, longitudinally movable spindle;

a base fixture adapted to be fitted to the dial indicator and having an elongated tubular track member through which the spindle extends;

a tubular collar member slidably mounted on the tubular track member of said base fixture, said collar member occupying a first position wherein said member is wholly mounted upon the tubular track member and movable to a second position wherein the outer end of the tubular collar member extends beyond the outer end of said tubular track member; and means coupling said tubular collar member to said base fixture for selectively and releasably holding said tubular collar member in said two positions including a guide pin attached to said base fixture and disposed in an elongated cavity in the tubular collar member, said guide pin and cavity being spaced from and generally parallel to said tubular track member.

7. In combination:

a dial indicator having a fixed tubular stem through which an elongated, longitudinally movable spindle extends;

a tubular base fixture having an enlarged portion and an elongated track member of reduced cross section and having a passage therethrough, said enlarged portion having a countersunk hole in alignment with the passage of said fixture and size to snugly engage the stem of the dial indicator;

a tubular collar member slidably mounted on the elongated track member of the base fixture, said tubular collar member having a first position wherein it is wholly mounted upon the elongated track member and a second position wherein the outer end of said tubular collar member extends beyond the outer end of said elongated track member; and means coupling said tubular collar member to said base fixture for selectively and releasably holding said tubular collar member in said two positions including a guide pin attached to said base fixture and disposed in an elongated cavity in the tubular collar member, said guide pin and cavity being spaced from and generally parallel to said tubular track member.

8. In combination:

a dial indicator having a fixed tubular stem through which an elongated, longitudinally movable spindle extends, said indicator recording measurements of engageable coaxial male and female connectors, the male connector having a concentric split ring member;

a tubular base fixture having an enlarged portion and an elongated tubular track member of reduced cross section and having a passage therein, said enlarged portion having a countersunk hole in alignment with the passage of said fixture and sized to snugly engage the stem of the dial indicator;

a tubular collar member slidably mounted on the tubular track member of the base fixture and having a tubular protuberance of reduced outside dimension adapted to fit about said split ring member of the male connector, said tubular collar member having a first position wherein it is wholly mounted upon the tubular track member with the outer end of said track member extending beyond the tubular protuberance and a second position wherein the outer end of the tubular protuberance extends beyond the outer end of said tubular track member; and means for selectively and releasably holding the tubular collar member in said two position.

References Cited by the Examiner
UNITED STATES PATENTS

| | | | |
|---|---|---|---|
| 2,541,758 | 2/1951 | Hahn | 33—172 |
| 3,007,250 | 11/1961 | Fisk | 33—172 |

LEONARD FORMAN, *Primary Examiner.*

J. M. FREED, *Assistant Examiner.*